United States Patent [19]

Takeshita

[11] Patent Number: 5,140,072
[45] Date of Patent: Aug. 18, 1992

[54] CURED BLENDS OF POLYCHLOROPRENE AND ETHYLENE COPOLYMERS

[75] Inventor: Tsuneichi Takeshita, Chadds Ford, Pa.

[73] Assignee: E. I. du Pont de Nemours and Company, Wilmington, Del.

[21] Appl. No.: 606,754

[22] Filed: Nov. 2, 1990

[51] Int. Cl.$^5$ .............................................. C08L 11/00
[52] U.S. Cl. ..................................... 525/215; 524/519
[58] Field of Search .......................... 525/215; 524/519

[56] References Cited

U.S. PATENT DOCUMENTS

| | | | |
|---|---|---|---|
| 3,701,702 | 10/1972 | Shichman et al. | 156/244 |
| 3,770,572 | 11/1973 | Henry et al. | 161/217 |
| 3,950,281 | 4/1976 | Usamoto et al. | 260/4 R |
| 4,235,980 | 11/1980 | Bateman | 525/215 |
| 4,298,712 | 11/1981 | Machonis, Jr. et al. | 525/74 |
| 4,307,204 | 12/1981 | Vidal | 521/140 |
| 4,581,468 | 7/1985 | Hazelton et al. | 524/426 |
| 4,593,062 | 6/1986 | Puydak et al. | 525/237 |
| 4,607,074 | 8/1986 | Hazelton et al. | 524/425 |
| 4,639,487 | 1/1987 | Hazelton et al. | 524/425 |

Primary Examiner—Paul R. Michl
Assistant Examiner—Olga Asinovsky
Attorney, Agent, or Firm—Marilyn H. Bromels

[57] ABSTRACT

The subject invention provides a cured non-foamed composition consisting of (i) polychloroprene and (ii) 2-25% by weight of the polymer composition of a copolymer of ethylene and at least one alpha-beta unsaturated carboxylic acid (or ionomer) or ester thereof and a process for making the same.

20 Claims, No Drawings

CURED BLENDS OF POLYCHLOROPRENE AND ETHYLENE COPOLYMERS

BACKGROUND OF THE INVENTION

This invention relates to polychloroprene rubber compositions having improved flex crack growth resistance.

Polychloroprene rubber, a homopolymer or copolymer of 2-chlorobutadiene, has traditionally been used to produce articles requiring a combination of heat and ozone resistance coupled with excellent dynamic properties, for example, flex crack growth resistance. In particular, sulfur-modified polychloroprene has long been considered the rubber of choice for articles subjected to repeated flexing, such as automotive belts, automotive boots, air-springs, and motor-mounts. There is, however, a need in the art to provide automotive parts for under-the-hood uses with an even greater reliability than that which is provided by sulfur-modified polychloroprene itself. A typical failure mode under dynamic load is fatigue, which propagates on an initial flaw. Consequently, it is the rate of cut growth which must be improved.

There are two general approaches to upgrading flex-fatigue resistance, by which term is meant prolonging the time to failure after an initial crack has been formed. The first involves modification of the polymer backbone by minimizing failure-initiating polymer defects, or by introducing heat- and/or fatigue-resistant segments. Such an approach is disclosed in U.S. Pat. No. 4,605,705. In the second approach the polymer backbone remains intact and flex-additives are blended with the polymer to produce crack growth-resistant compositions in much the same way as antioxidants and other stabilizers are used to produce polymer compositions having improved resistance to the effects of oxygen, ozone, light, etc. For example, mercaptotolylimidazole has been reported to be an effective flex-growth additive, see *Elastomerics*, Vol. 117, February 1985. In either case, however, it is to be understood that any attempt to improve flex-fatigue resistance must not result in degradation of other polymer physical properties. Most importantly there must be no decrease in modulus or increase in elongation, and, in addition, Mooney scorch must not be adversely affected.

Blends of polychloroprene and certain ethylene/(meth)acrylate copolymers have been disclosed in the prior art for the purpose of producing fiber-forming resins (see, e.g., U.S. Pat. No. 3,701,702, which exemplifies compositions having very low polychloroprene content), laminating adhesives (see, e.g., U.S. Pat. No. 3,770,572 directed to latex adhesives comprising polychloroprene and ethylene copolymers), cured foamed compositions (see, e.g., U.S. Pat. No. 4,307,204), and elastomeric extrudable/moldable compositions (see U.S. Pat. No. 4,235,980 directed to terionomer blends).

SUMMARY OF THE INVENTION

The subject invention provides:

a cured, non-foamed composition comprising (i) polychloroprene and (ii) 2-25% by weight of the polymer composition of a copolymer of ethylene and at least one alpha-beta unsaturated carboxylic acid or ester thereof;

a cured, non-foamed composition comprising (i) polychloroprene and (ii) 2-25% by weight of the polymer composition of an ionomer of a copolymer of ethylene and at least one alpha-beta unsaturated carboxylic acid or ester thereof;

a process comprising heating, in the absence of a foaming agent, a composition comprising (1) polychloroprene, (ii) 2-25% by weight of the polymer composition of a copolymer of ethylene and at least one alpha-beta unsaturated carboxylic acid or ester thereof, and (iii) a curing agent, at a temperature and for a time sufficient to cure the composition; and a process comprising heating, in the absence of a foaming agent, a composition comprising (i) polychloroprene, (ii) 2-25% by weight of the polymer composition of an ionomer of an ethylene alpha-beta unsaturated carboxylic acid copolymer, at a temperature and for a time sufficient to cure the composition.

DETAILED DESCRIPTION

The copolymers useful in the practice of the subject invention are those of ethylene and alpha-beta unsaturated carboxylic acids and esters thereof, as well as their corresponding ionomers, as described in U.S Pat. No. 3,437,718 (Rees). The carboxylic acids used in such polymers with ethylene may be mono- or dicarboxylic acids—either as free acids or their anhydrides. Usually such carboxylic acids contain from 3-8 carbon atoms. Representative carboxylic acid monomers used in the copolymers include acrylic acid, methacrylic acid, itaconic acid, maleic acid, fumaric acid, methyl hydrogen maleate, methyl hydrogen fumarate, and maleic anhydride. Although anhydrides such as maleic anhydride are not carboxylic acids per se because they have no hydrogen attached to the carboxyl group, polymers containing them are readily converted to ionomers by the action of the basic neutralizing agent. The esters of the carboxylic acids are preferably $C_1$-$C_{18}$ alkyl esters. Representative alkyl esters include methyl acrylate, methyl methacrylate, n-butyl acrylate, hexyl acrylate, decyl methacrylate, dodecyl methacrylate, ethyl maleate, propyl fumarate, ethyl itaconate, and the like. Representative copolymers include ethylene/acrylic acid copolymers, ethylene/methacrylic acid copolymers, ethylene/itaconic acid copolymers, ethylene/methyl hydrogen maleate copolymers and ethylene/maleic acid copolymers. In addition to ethylene and an alpha-beta unsaturated carboxylic acid, the copolymer can contain other copolymerizable monoethylenically unsaturated monomers in amounts up to about 50 mole percent of the copolymer. Such monomers include alkyl acrylates and alkyl methacrylates, usually having from 1-6 carbon atoms in the alkyl group, vinyl carboxylates and vinyl esters of organic acids in which the acid usually contains 2-8 carbon atoms, acrylic acid derivatives such as acrylonitrile or methacrylonitrile and alpha-olefins having 3-8 carbon atoms. Representative copolymers of this type include ethylene/acrylate/acrylic acid terpolymers such as ethylene/ethyl acrylate/methacrylic acid and ethylene/butyl acrylate/methacrylic acid, ethylene/methyl hydrogen maleate/methyl acrylate, ethylene/methacrylic acid/vinyl acetate, ethylene/propylene/acrylic acid, ethylene/methacrylic acid/acrylonitrile, and ethylene/vinyl chloride/acrylic acid copolymers.

As mentioned above, the ethylene polymer bearing acid functional groups can be neutralized to the ionomer by using basic metal compounds to convert the acid groups to ionic salt groups and thus form a salt of the copolymer of ethylene. Neutralization can take place before the ethylene polymer is mixed with the elastomer or neutralization to the ionomer can take place during the mixing operation. Representative basic metal compounds that can be used to neutralize the ethylene polymer to form the ionomer include the hydroxides, oxides, carbonate, bicarbonates, formates, and acetates of the metals of Groups I, II and III of the Periodic Table of the Elements. Representative basic metal compounds include sodium hydroxide, chromium octoate, lithium acetate, or magnesium acetylacetonate, but preferably zinc oxide is used.

The polychloroprenes which can be used in the practice of this invention are well known in the art. They can be prepared by polymerizing chloroprene, either alone or with one or more other comonomers, in aqueous emulsion, and are unmodified or modified by polymerization in the presence of sulfur or an organic, sulfur-containing chain transfer agent such as alkyl mercaptan or dialkyl xanthogen disulfide. Various methods of polymerization of chloroprene are disclosed, for example, in Encyclopedia of Polymer Science and Engineering, John Wiley and Sons, Volume 3, Second Edition, pages 441–462 (1985). Specific polymers and methods of their preparation are described, for example, in U.S. Pat. Nos. 2,494,087; 2,567,117; 2,567,009; 3,397,173; 3,655,827; 3,686,156; and 4,678,848.

Representative comonomers which can be copolymerized with chloroprene include vinyl aromatic compounds such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amides, and acrylate, methyl methacrylate, methacrylamide, and acrylonitrile.

Any conventional vulcanizing system for the polychloroprene rubber can be used to cure the composition. Generally, conventional vulcanizing temperatures of from about 130°–220° C. are used to cure the compositions. Vulcanizing agents include metal oxide, e.g., magnesium or zinc oxide, and organic accelerators or curing agents which can be amines, phenols, sulfenamides, thiazoles, thiurams, thioureas or sulfur.

The compositions of this invention can also include conventional fillers, such as carbon black and calcium carbonate, processing aids such as stearic acid and oleic acid, dessicants, accelerators, antioxidants, antiozonants, plasticizers, and lubricants that are normally used in compounded elastomeric compositions. The composition must not, however, contain a foaming agent due to the undesirable physical properties of such closed cell compositions for uses contemplated by the subject invention.

The composition of this invention is best prepared by mixing, about 75–98%, based on the weight of total polymer of the chloroprene polymer with about 2–25% based on the weight of total polymer of the ethylene polymer bearing ester or acid functional groups, either in the free acid or neutralized form, on a two-roll rubber mill at about 40°–100° C. for 5–30 minutes. The resulting composition may be cured and formed into shaped articles such as automotive belts, boots, air springs and motor mounts by extrusion molding, etc. under conditions necessary to reach the desired cure, depending upon the end use, as is well known in the art.

The benefits exhibited by the cured compositions of the subject invention will become more evident by reference to the examples that follow.

The following examples are illustrative of the invention, wherein all parts, proportions and percentages are by weight unless otherwise indicated.

EXAMPLES

Test Methods

The following ASTM test methods and conditions were used to determine the physical properties of the composition described in the Examples.

Demattia Flex: ASTM D813 300 cycles/minute using a 3.8 cm stroke on pierced sample, in thousands of cycles to a 1.27 cm (0.5 in.) growth Mooney Scorch: ASTM D1646 Small rotor at 121° C.

Tensile Strength, Modulus, Elongation at Break: ASTM D412 Cross-head speed 8.5 mm/sec (20 in/min) for tensile strength at break $(T_b)$; modulus at 100% elongation, $(M_{100})$; and elongation at break, $(E_B)$.

Hardness: ASTM 2240 Durometer A

EXAMPLE 1

Sample 1A was prepared by compounding 95 parts of a sulfur-modified polychloroprene having a Mooney viscosity ML-$100_{1+4}$ of 48, 5 parts of an ethylene/isobutyl acrylate/methacrylic acid copolymer (80/10/10 weight ratio, melt index 10 dg/min), 30 parts SRF carbon black, 5 parts zinc oxide, 4 parts Maglite D magnesium oxide, 1 part stearic acid, 2 parts of Wingstay 29 amine antioxidant (available from Goodyear Rubber Chemicals, Inc.), and 0.1 part of ethylenethiourea on a rubber mill. The compounded compositions were cured at 160° C. for 30 minutes. Physical properties of the cured composition are shown in Table I.

Control samples 1B and 1C were prepared in the same manner and with the same ratio of compounding ingredients except that for Sample 1B the polymer component consisted of 100 parts of the polychloroprene used in Sample 1A, and for Sample 1C the ethylene methacrylic acid copolymer was replaced with 5 parts of polyethylene of density of 0.92 g/cc and melt index 100. Physical properties of the cured control compositions are shown in Table 1 for comparison purposes.

TABLE I

| Parts by Weight | Example 1A | Comparative Example 1B | Comparative Example 1C |
|---|---|---|---|
| Polychloroprene | 95 | 100 | 95 |
| Ethylene Copolymer | 5 | — | — |
| Polyethylene | — | — | 5 |
| SRF Carbon Black | 30 | 30 | 30 |
| Zinc Oxide | 5 | 5 | 5 |
| MgO | 4 | 4 | 4 |
| Stearic Acid | 1 | 1 | 1 |
| Amine Antioxidant | 2 | 2 | 2 |
| Ethylene Thiourea | 0.1 | 0.1 | 0.1 |
| Physical Properties of Samples Cured at 160° C./30 Min. | | | |
| Mooney Scorch | | | |
| Minimum | 24 | 17 | 18 |
| Time to 5 Point Rise (Min.) | 20 | 22 | 23 |
| Time to 10 Point Rise (Min.) | 29 | 30 | 28 |
| Demattia Flex, 70° C. (Kc) | 39 | 1.2 | 1.2 |
| Hardness | 72 | 64 | 68 |
| $T_B$ (MPa) | 22 | 21.3 | 21.1 |
| $M_{100}$ (MPa) | 4.1 | 2.5 | 3.2 |
| $E_B$ (%) | 465 | 549 | 547 |

Sample 1A, a composition of the invention, exhibits a more than 30-fold improvement in flex resistance compared to either Control Sample 1B, an otherwise identical composition containing no ethylene copolymer, or Control Sample 1C, an otherwise identical composition containing ethylene homopolymer in place of ethylene/isobutyl acrylate/methacrylic acid copolymer.

EXAMPLE 2

Sample 2A, a composition of the invention, was prepared by compounding a blend of 95 parts of the sulfur-modified polychloroprene polymer of Example 1 with 5 parts of an ethylene/butyl acrylate copolymer (weight ratio 74/26) with the ingredients shown in Table II on a rubber mill. The compounded composition was cured at 160° C. for 30 minutes. Another composition of the invention, Sample 2B, was prepared in the same manner, except that the polymer blend consisted of 80 parts of the sulfur-modified polychloroprene polymer and 20 parts of the ethylene/butyl acrylate copolymer. Physical properties of the cured compositions were as shown in Table II. The physical properties of Control Sample 1B, a composition identical to Samples 2A and 2B, except that the polymer component consists of 100 parts of the sulfur-modified polychloroprene of Sample 2A, prepared as described in Example 1, are shown in Table II for comparison.

TABLE II

| Parts by Weight | Example 2A | Comparative Example 2B | Comparative Example 1B |
|---|---|---|---|
| Polychloroprene | 95 | 80 | 100 |
| Ethylene/Butyl Acrylate | 5 | 20 | — |
| SRF Carbon Black | 30 | 30 | 30 |
| Zinc Oxide | 5 | 5 | 5 |
| MgO | 4 | 4 | 4 |
| Stearic Acid | 1 | 1 | 1 |
| Amine Antioxidant | 2 | 2 | 2 |
| Ethylene Thiourea | 0.1 | 0.1 | 0.1 |
| Physical Properties of Samples Cured at 160° C./30 Min. | | | |
| Mooney Scorch | | | |
| Minimum | — | 24 | 17 |
| Time to 5 Point Rise (Min.) | | 20 | 22 |
| Time to 10 Point Rise (Min.) | | 26 | 30 |
| Demattia Flex, Kc | | | |
| 70° C. | 12 | — | 1.2 |
| Room Temperature | 48 | 900 | 7 |
| Hardness | 69 | 77 | 64 |
| $T_B$ (MPa) | 19 | 14.6 | 21.3 |
| $M_{100}$ (MPa) | 2.9 | 3.4 | 2.5 |
| $E_B$ (%) | 526 | 502 | 549 |

The compositions of the invention, which contain ethylene/butyl acrylate copolymer, exhibit a more than 7-fold and a more than 100-fold improvement in flex resistance, respectively, compared to a composition which is identical, except that it contains no copolymer.

EXAMPLE 3

Sample 3A, a composition of the invention, was prepared by compounding a blend of 85 parts of a mercaptan-modified chloroprene homopolymer having a Mooney viscosity ML-100$_{1+4}$ of about 45, with 15 parts of a 50% neutralized sodium ionomer of ethylene/n-butyl acrylate/methacrylic acid (68.9/22.5/8.6 weight ratio, melt index 0.9 dg/min.) with the ingredients shown in Table III on a rubber mill. A control sample, 3B, which was identical except that the polymer component consisted only of the polychloroprene was prepared in the same manner. The compounded compositions were cured at 160° C. for 30 minutes. Physical properties of the cured compositions were as shown in Table III.

TABLE III

| Parts by Weight | Example 3A | Comparative Example 3B |
|---|---|---|
| Polychloroprene | 85 | 100 |
| Ethylene/n-butyl acrylate/methacrylic acid ionomer | 15 | — |
| SRF Carbon Black | 30 | 30 |
| Zinc Oxide | 5 | 5 |
| MgO | 4 | 4 |
| Stearic Acid | 1 | 1 |
| Amine Antioxidant | 2 | 2 |
| Ethylene Thiourea | 1 | 1 |
| Physical Properties of Samples Cured at 160° C./30 Min. | | |
| Mooney Scorch | | |
| Minimum | 48 | 27 |
| Time to 5 Point Rise (Min.) | 8 | 7 |
| Time to 10 Point Rise (Min.) | 10 | 9 |
| Demattia Flex, Room Temperature (Kc) | 11 | <0.3 |
| Hardness | 80 | 64 |
| $T_B$ (MPa) | 15.2 | 19.4 |
| $M_{100}$ (MPa) | 6.0 | 3.0 |
| $E_B$ (%) | 235 | 332 |

The composition of the invention exhibits a ten-fold improvement in flex resistance compared to the control, which contains no ethylene/methacrylic acid ionomer.

I claim:

1. A covalently cured, non-foamed thermoset composition consisting essentially of (i) polychloroprene and (ii) 2–25% by weight of the polymer composition of a copolymer of ethylene and at least one alpha-beta unsaturated carboxylic acid or ester thereof, wherein said cured composition has a Demattia flex, as measured according to ASTM D813 at room temperature, at least about seven times greater than that of the polychloroprene component of said composition cured under the same conditions.

2. The composition of claim 1 wherein the ethylene copolymer is an ethylene/acrylate copolymer.

3. The composition of claim 1 wherein the ethylene copolymer is an ethylene/acrylate/acrylic acid terpolymer.

4. The composition of claim 1 wherein the ethylene copolymer is an ethylene/butyl acrylate/methacrylic acid terpolymer.

5. The composition of claim 1 wherein the ethylene copolymer is an ethylene/butyl acrylate copolymer.

6. The composition of claim 1 wherein the ethylene copolymer is an ethylene/isobutyl acrylate/methacrylic acid copolymer.

7. A covalently cured, non-foamed thermoset composition consisting essentially of (i) polychloroprene and (ii) 2–25% by weight of the polymer composition of an ionomer of a copolymer of ethylene and at least one alpha-beta unsaturated carboxylic acid, wherein said cured composition has a Demattia flex, as measured according to ASTM D813 at room temperature, at least about seven times greater than that of the polychloroprene component of said composition cured under the same conditions.

8. The composition of claim 7 wherein the ethylene copolymer is an ethylene/acrylic acid copolymer.

9. The composition of claim 7 wherein the ethylene copolymer is an ethylene/acrylate/acrylic acid terpolymer.

10. The composition of claim 7 wherein the ethylene copolymer is an ethylene/n-butyl acrylate/methacrylic acid terpolymer.

11. The composition of claim 7 wherein the ionomer an Na ionomer.

12. A shaped article of a composition selected from those of claim 1, 2, 3, 4, 5, 6, 7, 8, 9, 10, and 11.

13. A process for preparing a cured, thermoset polychloroprene composition comprising heating, in the absence of a foaming agent, a composition consisting essentially of (i) polychloroprene, (ii) 2-25% by weight of the polymer composition of a copolymer of ethylene and at least one alpha-beta unsaturated carboxylic acid or ester thereof, and (iii) a curing agent capable of covalently crosslinking the polychloroprene, at a temperature and for a time sufficient to cure the composition, thereby providing a thermoset composition having a Demattia flex, as measured according to ASTM D813 at room temperature, at least about seven times greater than that of the polychloroprene component of said composition cured under the same conditions.

14. The process of claim 13 wherein the curing agent is selected from metal oxides, amines, phenols, sulfenamides, thiazoles, thiurams, thioureas and sulfur.

15. The process of claim 13 or 14 wherein the ethylene copolymer is an ethylene/acrylate copolymer.

16. The process of claim 13 or 14 wherein the ethylene copolymer is an ethylene/acrylate/acrylic acid terpolymer.

17. A process for preparing a cured, thermoset polychloroprene composition comprising heating, in the absence of a foaming agent, a composition consisting essentially of (i) polychloroprene, (ii) 2-25% by weight of the polymer composition of an ionomer of an ethylene alpha-beta unsaturated carboxylic acid copolymer, and (iii) a curing agent capable of covalently crosslinking the polychloroprene, at a temperature and for a time sufficient to cure the composition, thereby providing a thermoset composition having a Demattia flex, as measured according to ASTM D813 at room temperature, at least about seven times greater than that of the polychloroprene component of said composition cured under the same conditions.

18. The process of claim 17 wherein the curing agent is selected from metal oxides, amines, phenols, sulfenamides, thiazoles, thiurams, thioureas and sulfur.

19. The process of claim 17 or 18 wherein the ethylene copolymer is an ethylene/acrylic acid copolymer.

20. The process of claim 17 or 18 wherein the ethylene copolymer is an ethylene/acrylate/acrylic acid terpolymer.

* * * * *